March 22, 1938. E. W. SMITH 2,112,203
METHOD OF TREATING MILK
Filed Oct. 7, 1937
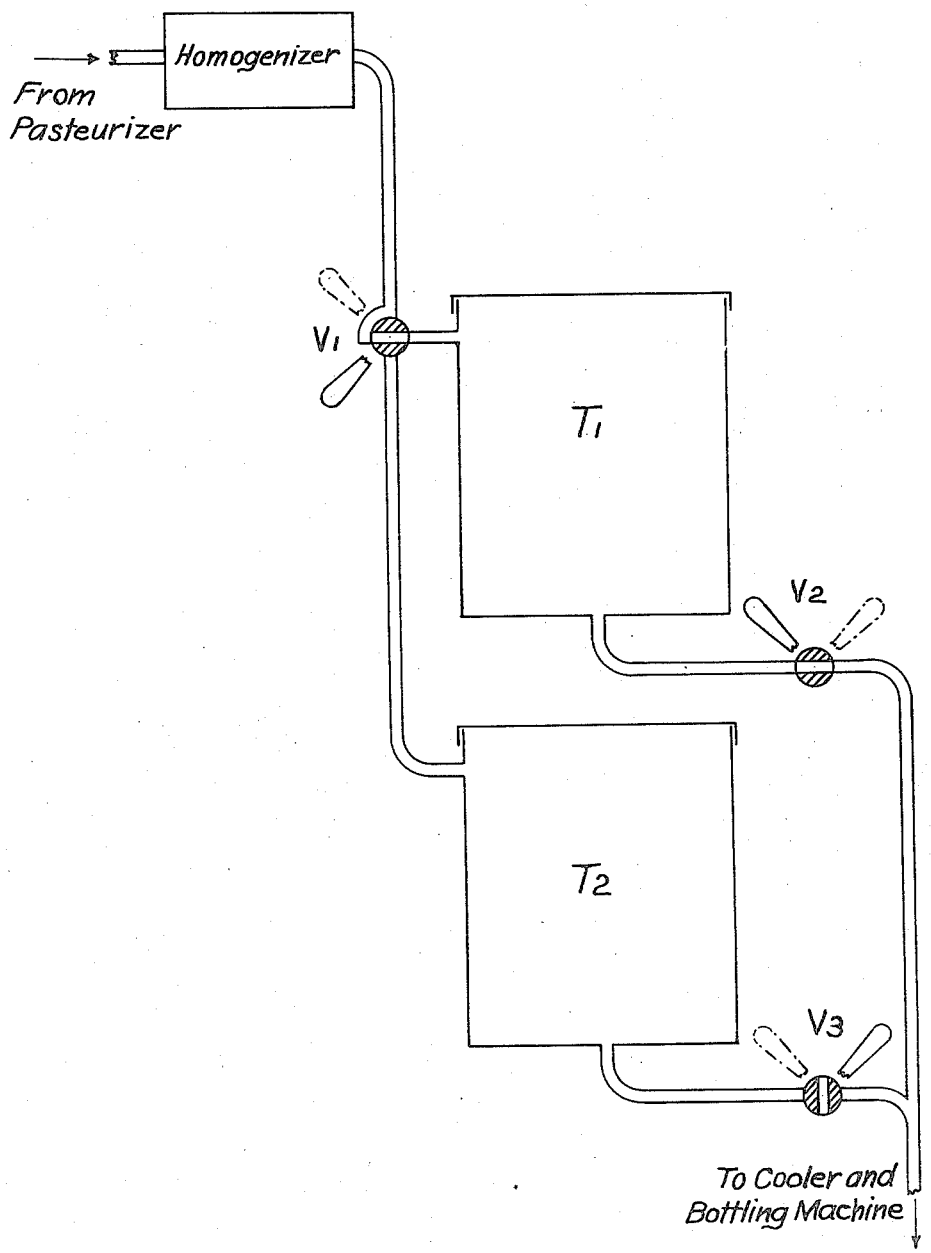
INVENTOR.
EDWARD W. SMITH
BY
ATTORNEY.

Patented Mar. 22, 1938

2,112,203

UNITED STATES PATENT OFFICE 2,112,203

METHOD OF TREATING MILK

Edward W. Smith, Melrose, Mass., assignor to Submarine Signal Company, Boston, Mass., a corporation of Maine Application October 7, 1937, Serial No. 167,745

7 Claims. (Cl. 99—60)

The present invention relates to a method for the treatment of milk. More particularly the present invention relates to a method for the treatment of milk to bring about curd tension reduction and homogenization.

It is well known that the curd tension of whole milk from various cows tends to vary and on the average is rather high. One of the ways of reducing the curd tension of milk is by the use of a pressure homogenizer.

The latter is an apparatus for forcing the milk under pressure through a small orifice. In order to obtain a satisfactory curd tension reduction with a pressure homogenizer it is necessary to operate the device at a very high pressure, usually from 2,000 to 3000 pounds per square inch. If this is done the fat particles in the milk are very finely subdivided and thoroughly dispersed in the milk. After milk has been homogenized in this manner it is extremely difficult subsequently to separate much of the butter fat from the milk. However, it is often desirable to provide a soft curd milk which is sufficiently well homogenized so that the cream will not rise if the milk be left standing for a period of from 24 to 48 hours. Nevertheless, it is desirable in many cases to be able to remove most of the butter fat from the milk, particularly in cases where dairies take back from milk dealers milk which was not sold during the preceding day.

In my copending patent application Serial No. 69,365, filed May 17, 1936, I have disclosed a method of treating milk whereby soft curd characteristics could be obtained in homogenized milk without rendering the total butter fat therein so finely divided as to preclude the possibility of separating it out afterwards.

In general, the method described in that application comprises allowing the whole milk which is to be treated to stand in a settling tank long enough to permit the majority of the cream content to rise to the top of the body of the milk, passing the majority of the milk, which then contains only a small portion of the cream, through a pressure homogenizer at a high pressure, then passing the remaining milk and cream through the pressure homogenizer at a low pressure and subsequently mixing both homogenized portions.

In a large number of milk plants the above method would be very useful but in certain other plants where storage facilities are limited a more convenient arrangement would be desirable.

Now, in my copending application Serial No. 134,575, filed April 2, 1937, I disclosed a method of obtaining soft curd milk in which, however, the butter fat is not all dispersed so that a substantial portion of it will rise to the top of the milk upon standing.

The latter method in general comprises homogenizing a portion of the whole milk, say, about 20% of the entire body of the milk, in such a manner that a substantial reduction of the curd tension is obtained. This homogenized portion is then mixed with the remaining whole milk whereby the curd tension of the resulting product is substantially reduced below the curd tension of the original whole milk, but yet a good cream line will be obtained.

The present invention provides a method of obtaining homogenized milk with a reduced curd tension but from which a substantial part of the butter fat can subsequently be removed if desired, for example by means of a cream separator, and furthermore, of accomplishing this result without the necessity of providing large settling tanks.

According to the present invention, a majority of the whole milk to be treated, for example 75% to 80%, is homogenized at a low pressure, say 500 pounds per square inch, at which no substantial curd tension reduction is obtained, but the fat particles are of sufficient size to permit subsequent separation of the cream if desired. The remaining minor portion of the whole milk is then homogenized at a high pressure, say 2500 to 3000 pounds per square inch, sufficient to bring about a substantial curd tension reduction. The two portions of milk are then mixed. As a result of this procedure homogenized milk is obtained which has a satisfactorily low curd tension.

A convenient arrangement for carrying out the above method is schematically shown in the drawing. According to this arrangement, milk is conducted directly from the pasteurizer, while its temperature is still relatively high, to the homogenizer, after which it passes through a two-way valve VI into either of tanks T1 or T2. From these tanks further conducting pipes lead through the valves V2 and V3, respectively, to the cooler and bottling machine. If desired, the cooler may be placed between the homogenizer and the valve VI.

In operating this arrangement the homogenizer may be set to operate at a low pressure, say 500 pounds or just sufficient to prevent gravitational separation of the dispersed butter fat, and the valve VI set to deliver this milk to the tank T2. After a supply of milk has been treated at this pressure, the homogenizer pressure may be raised to 2500 or 3000 pounds per square inch or sufficient to obtain a substantial curd tension reduction, and the valve V1 set to divert the milk coming from the pressure homogenizer to the tank T1. The valves V2 and V3 are then adjusted to deliver approximately three times as much milk from the tank T2 as is delivered from the tank T1. Thus, out of every four quarts of milk going into the cooler one quart will have been homogenized at a pressure of 2500 pounds, and three quarts will have been homogenized at a pressure of 500 pounds. By watching the levels of the milk in the two tanks the operator can by changing the pressure and settings of the valve V1 keep the two tanks supplied with milk homogenized at the proper pressures and of sufficient quantities to maintain a continuous flow to the cooler and bottling machine.

It will be obvious that the tanks T1 and T2 need be only great enough to keep the bottling machine adequately supplied so that the system can be made substantially continuous and large settling tanks as employed in the system described in my copending application Serial No. 69,365, are not required.

Furthermore, the present method is of considerable assistance in eliminating sedimentation in the milk which normally accompanies complete homogenization of milk at pressures high enough to give satisfactory curd tension reductions.

Having now described my invention, I claim:

1. A method of treating whole hard curd milk with a pressure homogenizer which comprises passing a major quantity of the whole hard curd milk through the pressure homogenizer at a low pressure insufficient to bring about a substantial curd tension reduction, passing the minor portion of the whole hard curd milk through a pressure homogenizer at a relatively high pressure sufficient to bring about a substantial curd tension reduction, and subsequently remixing both portions of the milk, whereby a soft curd milk is produced.

2. A method of treating normal whole hard curd milk which comprises homogenizing a minor quantity of the same to lower the curd tension thereof to a relatively low value, partially homogenizing a major portion of the whole hard curd milk, and subsequently remixing the two homogenized portions, whereby a soft curd milk is produced.

3. A method of treating normal whole hard curd milk which comprises homogenizing a minor portion of the milk under conditions sufficient to bring about a substantial reduction in the curd tension thereof, homogenizing the remaining major portion of the milk under conditions sufficient merely to bring about such a dispersion of the butter fat as to inhibit gravitational separation of the cream from the body of the milk, and subsequently remixing the two portions, whereby a soft curd milk is produced.

4. A method of treating milk which comprises homogenizing a quantity of normal whole hard curd milk to reduce the curd tension thereof to a relatively low value and subsequently mixing the same with a quantity of similar whole hard curd milk which has been homogenized only sufficiently to inhibit the rise of the cream thereon, in the proportion of approximately one part of the former to three parts of the latter, whereby a soft curd milk is produced.

5. A method of making soft curd homogenized hard curd milk which comprises homogenizing a minor body of milk under conditions sufficient to reduce the curd tension thereof to a relatively low value and subsequently mixing said body of milk with a major body of homogenized milk having a hard curd tension whereby the curd tension of the mixture is below the maximum limits established for soft curd milk.

6. A method of treating whole hard curd milk which comprises passing approximately 75% thereof through a pressure homogenizer at a pressure of approximately 500 pounds per square inch, passing the remaining 25% of the milk through the homogenizer at a pressure of approximately 2500 pounds per square inch whereby the curd tension of the latter portion is substantially reduced and subsequently remixing the two homogenized portions whereby a soft curd milk is produced.

7. A method of producing homogenized milk with a low curd tension which comprises dispersing butter fat in a minor portion of a body of normal whole hard curd milk to a sufficiently small drop size to bring about substantial curd tension reduction of said portion, dispersing the butter fat in the remaining major portion of the hard curd milk to a sufficiently large drop size to permit subsequent separation thereof from the milk, and mixing the two portions so treated.

EDWARD W. SMITH.